May 6, 1924.
A. BURRELL
ADVERTISING DEVICE
Filed Feb. 23, 1923
1,492,722
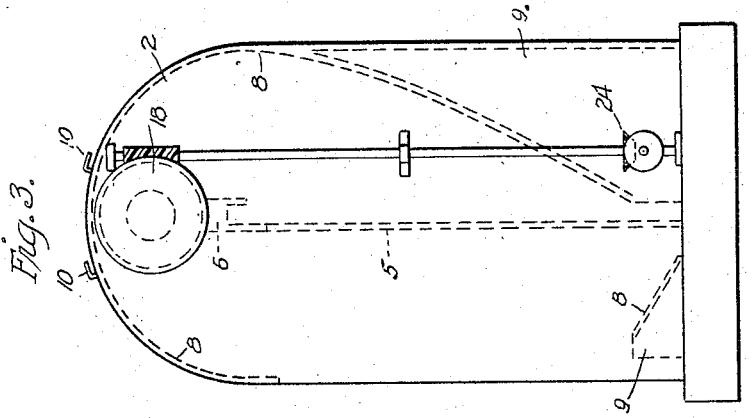
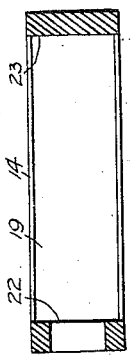
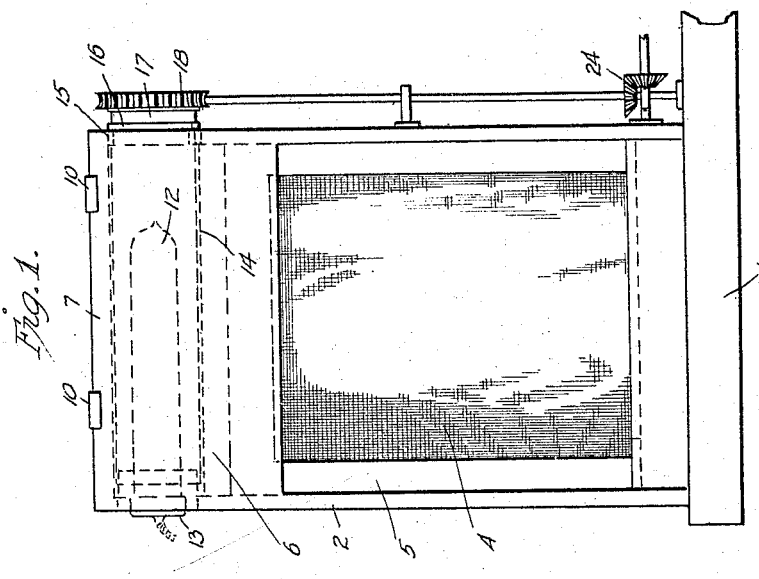
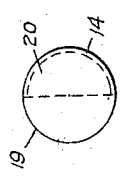
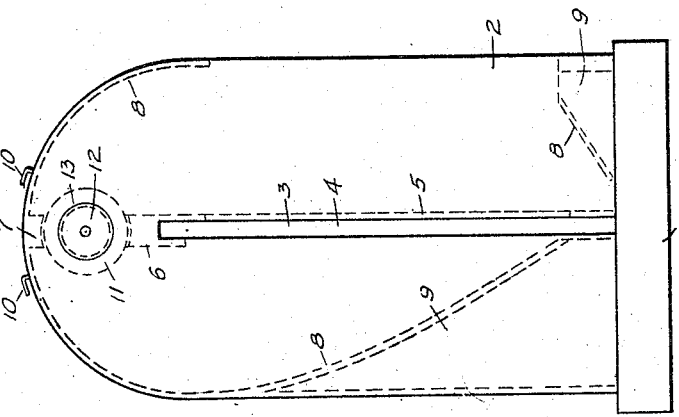
Austin Burrell
Inventor
By his Attorney Patented May 6, 1924.

1,492,722

UNITED STATES PATENT OFFICE.

AUSTIN BURRELL, OF NEW ROCHELLE, NEW YORK.

ADVERTISING DEVICE.

Application filed February 23, 1923. Serial No. 620,843.

*To all whom it may concern:*

Be it known that I, AUSTIN BURRELL, a citizen of the United States, and a resident of New Rochelle, State of New York, have invented a new and useful Advertising Device, of which the following is a specification.

The invention relates to a device for advertising purposes or for pictorial display— in which a tubular shade revolving about a fixed light illuminates a picture or design painted or processed on the face of a screen, and also a picture or design painted or processed on the back of said screen. The illumination at the back of the screen causes the picture or design to be seen by an observer at the view point, as a transparency or partial transparency. The change from full light in front of the screen to full light at the back of the screen is smooth and gradual that one picture or design fades into the other picture or design.

One form of the invention is illustrated in the accompanying drawing in which Fig. 1 is a front elevation of the device.

Fig. 2 is a left-hand, side elevation of the box.

Fig. 3 is a right-hand, side elevation of the box, and

Fig. 4 is a vertical longitudinal section of the tubular shade showing cut-away surface.

Fig. 5 is a vertical cross-section of the tubular shade showing the cut-away surface.

The base or stand 1 preferably in the form of a rectangular block is as shown in Figs. 1-2-3. The left-hand side of the box 2 is provided with a slot 3 through which may be inserted a screen 4 in height equal to that of slot 3 (allowing for play) and in width equal to the inside width of the box.

The screen 4 is made of a fine muslin, long cloth or some similar textile, treated with paraffine wax and thinly shellacked and mounted on a suitable frame.

Or the screen may be made of glass, plain or ground suitably framed.

When screen 4 is made from a textile, a picture or design is painted or processed in oil color or some suitable medium, on the face of said screen ("face" as used here or hereafter, meaning the side showing to an observer at the view point) and on the back of said screen is painted or processed a picture or design in varying degrees of density of pigment and medium so that by illumination through the various transparencies, the effect of a complete picture or design is shown to an observer at the view-point. If the screen be made of glass, the pictures or designs may be lithographed or processed in color on paper and then applied to the front and back of the screen, serving the same purpose as a picture or design, painted or processed directly on said screen, or the pictures or designs may be painted or processed directly upon the glass.

Supported approximately centrally within the box 2 is a frame 5 which acts as a picture frame to the screen 4. Extending transversely within the box 2 is a cross piece 6 having a lower slotted portion to receive the screen 4 and an upper concave face similar in arc to the cross-section of the tubular shade 14 hereinafter referred to. The cross-piece 7 in vertical alinement with the cross piece 6 has a concave bottom similar in arc to the upper concave face of cross-piece 6.

These cross-pieces 6 and 7, fitting closely to and in combination with the shade 14, control the emission of light from the tubular lamp or lamps 12 supported in the box 2 between the cross pieces 6 and 7 so that the transition from full light on the face of screen 4 to full light on the back of screen 4 is gradually effected. When shade 14 has reached a position where its open side is perpendicular, full light is admitted to the front of screen 4. As the shade 14 revolves around the lamp or lamps 12 the brilliancy of illumination increases on one side of the screen 4 in the same proportion that it diminishes on the other side of screen 4 until the dotted diameter of the cross-section is again perpendicular, when full light is admitted to the back of screen 4. The reflectors 8 suitably positioned within the box 2, Figs. 2 and 3, may be made of metal fibre or 3 ply profile-board painted with a white, reflecting substance.

This reflector 8 may be attached to the top and back 21 of the box or the top and back 21 may serve as reflectors being suitably painted on the inside.

The backing 9 to reflectors at bottom may be of wood or the space may be left hollow. The ventilators 10 preferably positioned at the top of box 2 carry away the heat from lamp or lamps 12.

A tubular bearing 11 at a point inside and near the top of the box 2, carries on its outer surface the open end of the revolving tubular shade 14 and on its inner surface, the socket of the tubular lamp 12. The top and back 21 and the sides of the box may be made of wood or of metal. The lamp 12 is a tubular mazda—the wattage being governed by the size of the device. The lamp or lamps 12 may be colored wholly or partially.

The lamp socket 13 is designed to be supported in bearing 11. The tubular shade 14 may be made of metal or compressed fibre and painted or covered on the inside with a reflecting substance. The shade 14 revolves at the open end on the bearing 11 and at the opposite end in the bearing 15 terminating on the right-hand side of the box 2 Fig. 3, in a heading 16 and 17 to which is attached a grooved and threaded wheel 18 operated by a motor-driven worm-gear 24 which may be controlled by a timing device, or driven by a suitable clockwork (not shown). In Fig. 4 the shade 14 is shown with a cut-away portion 19 which is formed by leaving open or cutting away a space bounded by shaded lines 22 and 23 and end walls and Fig. 5 shows the solid surface area 20 and cut-away surface area 19 of the cylinder.

It will be understood that the opposite faces of the screen may have thereon the same picture or design differing in coloring and/or degrees of transparency, or the pictures or designs may be entirely different in both drawing and coloring, and the term "different design" or its equivalent as used in the claims is to be so understood.

I claim:

1. In a device of the character described, a light pervious member, having different designs on its opposite faces, a source of light, and means whereby light from said source is successively directed to and cut off from each of the opposite faces of said member.

2. In a device of the character described, a light pervious member, having different designs on its opposite faces, a fixed source of light, and means including a rotatable element whereby light from said source is successively directed to and cut off from each of the opposite faces of said member.

3. In a device of the character described, a light pervious member carrying different designs on its opposite faces, light reflecting means adjacent each of the opposite faces of said member, and means for projecting light alternately to said reflecting means whereby the opposite faces of said member are alternately illuminated.

4. In a device of the character described, a light pervious member, having different designs on its opposite faces, a source of light, and means rotatable about said source to successively direct light to and cut it off from each of the opposite faces of said member.

5. In a device of the character described, a light pervious member, having different designs on its opposite faces, a source of light, light reflecting means adjacent each of the opposite faces of said member, and means rotatable about said source for projecting light alternately to said reflecting means whereby the opposite faces of said member are alternately illuminated.

6. In a device of the character described, a light pervious member, having different designs on its opposite faces, light reflecting means adjacent each face thereof, a source of light, and a light reflecting shade having an opening therein revoluble about said source to direct light from said source alternately to said light reflecting means.

7. In a device of the character described, a casing having inner light reflecting faces, a light pervious member within said casing, said members having different designs on its opposite faces a source of light within the casing adjacent said member, and means rotatable about said source of light for directing light therefrom alternately to the opposite inner light reflecting faces whereby the opposite faces of said member are alternately illuminated.

8. In a device of the character described, a casing having inner light reflecting faces, a light pervious member within said casing, said member having different designs on its opposite faces, oppositely disposed cross pieces within said casing, a source of light supported between the opposed faces of the cross pieces, and means rotatable about said source to direct light therefrom alternately to the opposite light reflecting faces whereby the opposite faces of the member are alternately illuminated.

9. In a device of the character described, a casing having inner light reflecting faces, oppositely arranged cross pieces within said casing having their opposed faces complementally curved, a light pervious member having different designs on its opposite faces adapted to be arranged in line with said cross pieces, a source of light supported between the opposed faces of the cross pieces, and a partly cut-away shade similar in curvature to the opposed faces of the cross pieces rotatable about the source of light.

AUSTIN BURRELL.